(12) United States Patent
Tsubouchi

(10) Patent No.: US 10,484,444 B2
(45) Date of Patent: *Nov. 19, 2019

(54) COMMUNICATION METHOD, COMMUNICATION DEVICE, AND RECORDING MEDIUM FOR STREAMING

(71) Applicant: FUJITSU LIMITED, Kawasaki-shi, Kanagawa (JP)

(72) Inventor: Masatoshi Tsubouchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 423 days.

This patent is subject to a terminal disclaimer.

(21) Appl. No.: 15/237,016

(22) Filed: Aug. 15, 2016

(65) Prior Publication Data
US 2017/0063955 A1 Mar. 2, 2017

(30) Foreign Application Priority Data
Sep. 1, 2015 (JP) .................. 2015-172182

(51) Int. Cl.
*G06F 15/16* (2006.01)
*H04L 29/06* (2006.01)
(Continued)

(52) U.S. Cl.
CPC ........ *H04L 65/601* (2013.01); *G06F 12/0813* (2013.01); *H04L 43/16* (2013.01);
(Continued)

(58) Field of Classification Search
None
See application file for complete search history.

(56) References Cited

U.S. PATENT DOCUMENTS 7,027,455 B2 4/2006 Floyd
7,092,615 B2 * 8/2006 Tanikawa ............... H04N 5/76
386/241

(Continued)

FOREIGN PATENT DOCUMENTS

EP 2 362 651 A1 8/2011
JP 2008-135825 A 6/2008
(Continued)

OTHER PUBLICATIONS

European Search Report dated Jan. 24, 2017, issued in counterpart European Patent Application No. 16183809.9. (9 pages).
(Continued)

*Primary Examiner* — Mohamed Ibrahim
(74) *Attorney, Agent, or Firm* — Westerman, Hattori, Daniels & Adrian, LLP; John P. Kong

(57) ABSTRACT

A mobile information device includes a first obtaining unit, a second obtaining unit, a reproduction unit and an issuing unit. The first obtaining unit obtains data by using a first line. The second obtaining unit obtains data by using a second line. The reproducing unit conducts streaming reproduction of the data obtained by one selected from the first obtaining unit and the second obtaining unit. The issuing unit divides unobtained data in neighborhood of a reproduction position for streaming reproduction of the obtained data and issues a task of executing obtainment of data to one selected from the first obtaining unit and the second obtaining unit, for each of the positions at which the data is divided.

8 Claims, 10 Drawing Sheets

(51) Int. Cl.
*G06F 12/0813* (2016.01)
*H04L 12/26* (2006.01)
*H04L 29/08* (2006.01)

(52) U.S. Cl.
CPC ........ *H04L 65/4084* (2013.01); *H04L 65/604* (2013.01); *H04L 65/608* (2013.01); *H04L 65/80* (2013.01); *G06F 2212/154* (2013.01); *G06F 2212/60* (2013.01); *G06F 2212/62* (2013.01); *H04L 67/2842* (2013.01)

(56) References Cited

U.S. PATENT DOCUMENTS

| | | | |
|---|---|---|---|
| 8,447,831 | B1 | 5/2013 | Sivasubramanian et al. |
| 8,880,647 | B2 | 11/2014 | Pantos |
| 9,191,465 | B2 | 11/2015 | Watson et al. |
| 9,917,791 | B1 | 3/2018 | Goldfain et al. |
| 2002/0044606 | A1* | 4/2002 | Togashi ......... H04N 21/234327 375/240.12 |
| 2004/0172476 | A1 | 9/2004 | Chapweske |
| 2010/0146569 | A1 | 6/2010 | Janardhan et al. |
| 2010/0325301 | A1* | 12/2010 | Kwon ................ H04L 1/06 709/231 |
| 2011/0055328 | A1 | 3/2011 | Lahr et al. |
| 2011/0106964 | A1 | 5/2011 | Bennett et al. |
| 2011/0225302 | A1 | 9/2011 | Park et al. |
| 2012/0311174 | A1* | 12/2012 | Bichot ............. H04N 21/44209 709/231 |
| 2013/0095806 | A1 | 4/2013 | Salkintzis et al. |
| 2013/0103849 | A1 | 4/2013 | Mao et al. |
| 2013/0227102 | A1 | 8/2013 | Beck et al. |
| 2013/0232228 | A1 | 9/2013 | Ramamurthy et al. |
| 2014/0052846 | A1 | 2/2014 | Scherkus et al. |
| 2014/0129893 | A1 | 5/2014 | Rigaudeau et al. |
| 2014/0143431 | A1 | 5/2014 | Watson et al. |
| 2014/0189099 | A1 | 7/2014 | Hurst et al. |
| 2014/0259082 | A1 | 9/2014 | Broome et al. |
| 2015/0341632 | A1* | 11/2015 | Syed ................ H04N 19/0006 375/240.03 |
| 2017/0063945 | A1 | 3/2017 | Tsubouchi |
| 2017/0063955 | A1 | 3/2017 | Tsubouchi |
| 2018/0041375 | A1 | 2/2018 | Takeuchi |

FOREIGN PATENT DOCUMENTS

| | | |
|---|---|---|
| JP | 2013-520119 A | 5/2013 |
| WO | 2009/142059 A1 | 11/2009 |

OTHER PUBLICATIONS

Office Action dated Dec. 5, 2018, issued in counterpart European Application No. 16183809.9. (7 pages).

Office Action dated Feb. 19, 2019, issued in counterpart JP Application No. 2015-172182, with English machine translation. (9 pages).

Office Action dated Feb. 19, 2019, issued in counterpart JP Application No. 2015-172061, with English machine translation. (6 pages).

European Search Report dated Jan. 13, 2017, issued in European Application No. 16182986.6 (8 pages).

Non-Final Office Action dated Apr. 18, 2018, issued in U.S. Appl. No. 15/231,007 (23 pages).

Notice of Allowance dated Oct. 31, 2018, issued in U.S. Appl. No. 15/231,007 (10 pages).

\* cited by examiner

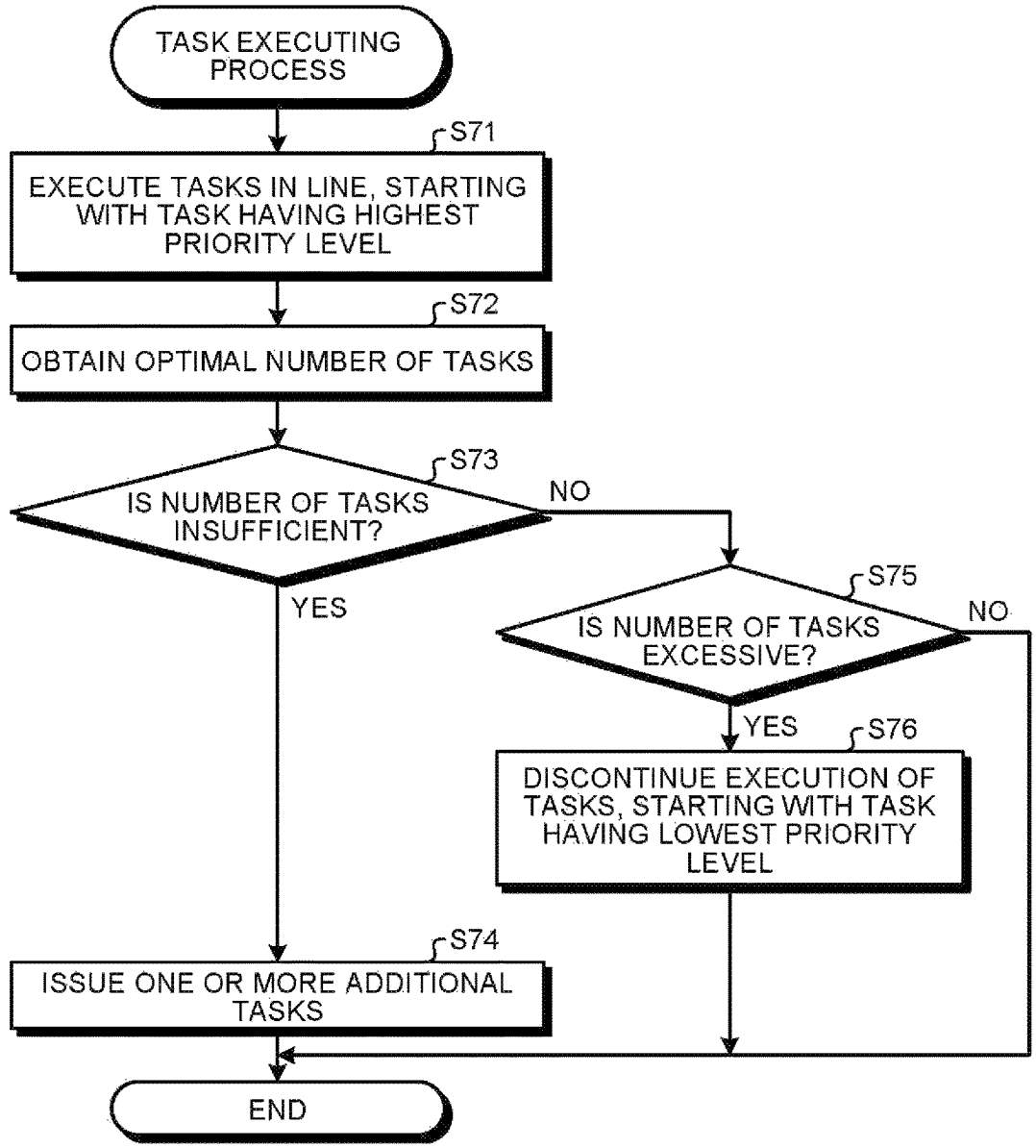

FIG.10A
ALREADY CACHED
FIG.10B
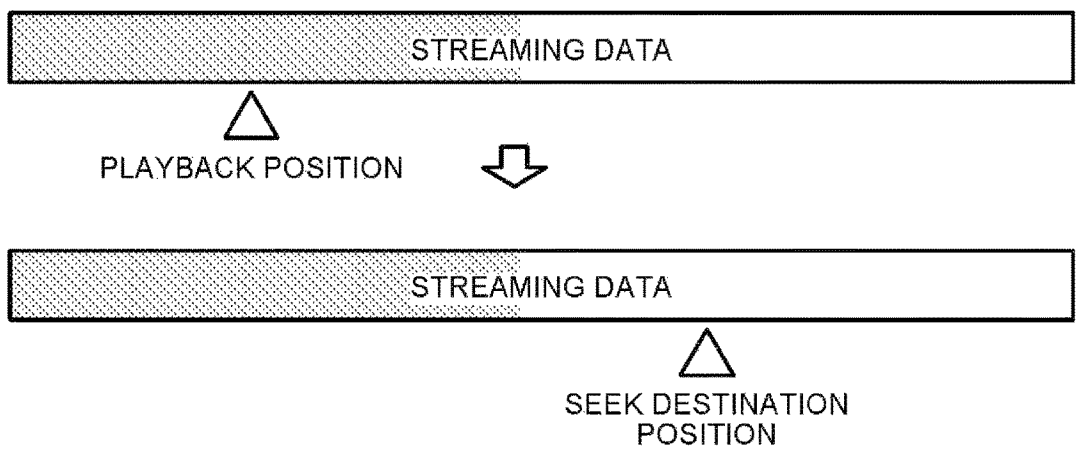

COMMUNICATION METHOD, COMMUNICATION DEVICE, AND RECORDING MEDIUM FOR STREAMING

CROSS-REFERENCE TO RELATED APPLICATION

This application is based upon and claims the benefit of priority of the prior Japanese Patent Application No. 2015-172182, filed on Sep. 1, 2015, the entire contents of which are incorporated herein by reference.

FIELD

The embodiment discussed herein is related to a communication method, a communication device, and a recording medium.

BACKGROUND

A mobile terminal uses a method by which, for example, a piece of content is divided into N pieces of data that are to be downloaded at the same time as one another. This method realizes high-speed data communication by arranging the N pieces of data resulting from the dividing process to be downloaded at the same time as one another. Further, a mobile terminal may perform a streaming communication process in which data of a moving picture or the like is reproduced while being downloaded. When performing the streaming communication process, the mobile terminal is able to reproduce the data while downloading the data.
Patent Document 1: International Publication Pamphlet No. WO 2009/142059

However, the mobile terminal is configured so as to execute tasks such as the downloading, for example, equally among the pieces of data resulting from the dividing process. Thus, when it is impossible to execute the task at a reproduction position, the mobile terminal is unable to conduct streaming reproduction. Consequently, it is the current situation that a mechanism to execute the task at the reproduction position with priority is in demand.

SUMMARY

According to an aspect of the embodiments, a communication method is implemented by a communication device. The communication method includes obtaining data by using one selected from a first line and a second line. The communication method includes conducting streaming reproduction of the obtained data. The communication method includes dividing unobtained data in neighborhood of a reproduction position for streaming reproduction of the obtained data and issuing a task of executing obtainment of data to one selected from the first line and the second line, for each of positions at which the data is divided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flowchart of an example of a processing operation performed by the CPU in relation to a task executing process;

FIGS. 10A and 10B are a drawing for explaining an exemplary operation in a task executing process during a seek operation.

DESCRIPTION OF EMBODIMENTS

Preferred embodiments of the present invention will be explained with reference to accompanying drawings. The present disclosure is not limited to the exemplary embodiments. Further, it is acceptable to combine together any of the embodiments described below as appropriate, as long as no conflict arises.

Figure 1:
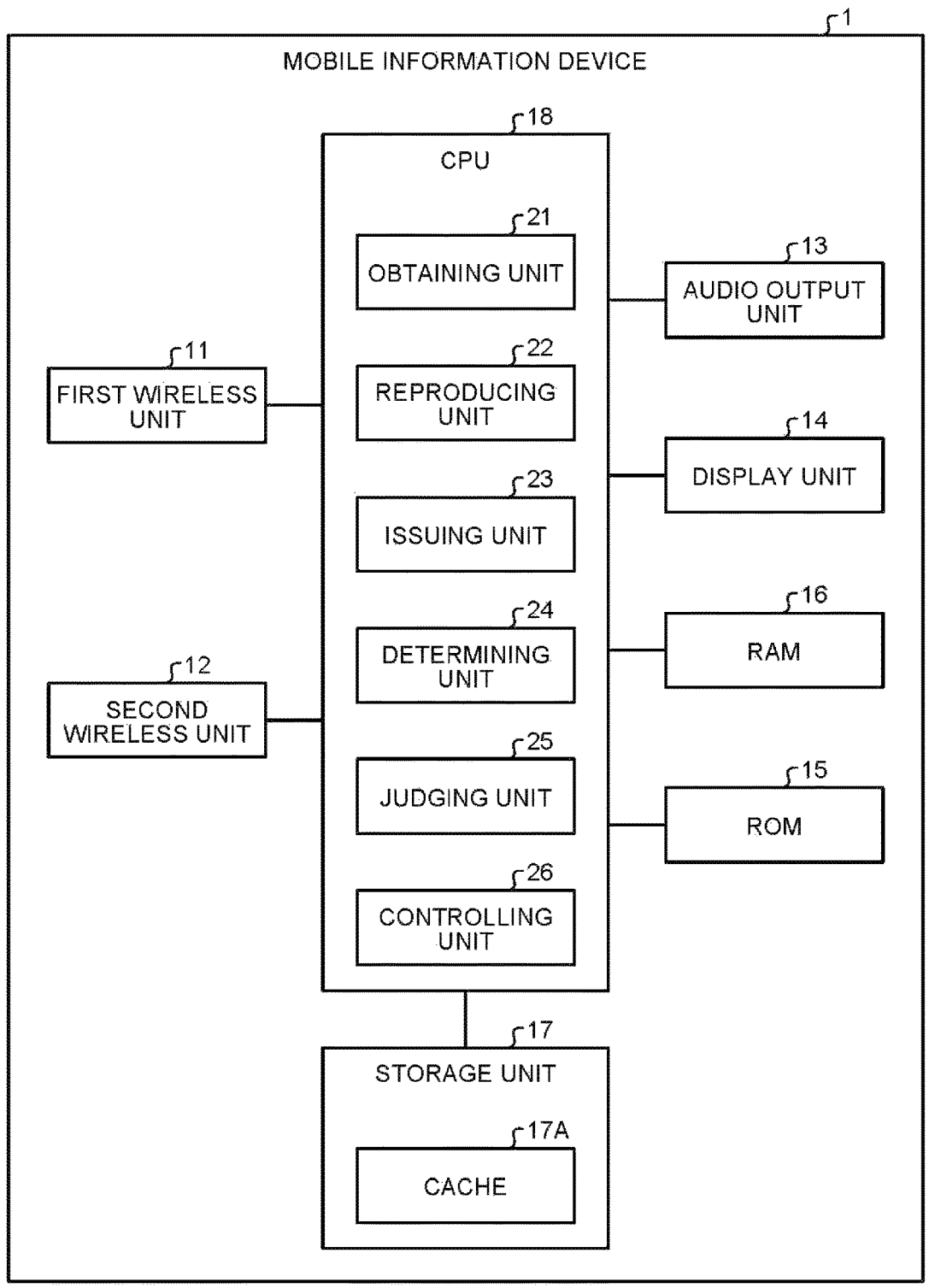
FIG. 1 is a diagram for explaining an exemplary configuration of a mobile information device according to an embodiment of the present disclosure.

FIG. 1 is a diagram for explaining an exemplary configuration of a mobile information device 1 according to an embodiment of the present disclosure. The mobile information device 1 illustrated in FIG. 1 may be, for example, a mobile phone, a Personal Digital Assistant (PDA), a personal computer, a car navigation device, or the like. The mobile information device 1 includes a first wireless unit 11, a second wireless unit 12, an audio output unit 13, a display unit 14, a Read-Only Memory (ROM) 15, a Random Access Memory (RAM) 16, a storage unit 17, and a Central Processing Unit (CPU) 18.

The first wireless unit 11 is a wireless unit that performs wireless communication by using a first line (e.g., Wi-Fi [registered trademark]). The first wireless unit 11 is capable of accessing a content server (not illustrated) and obtaining (downloading) streaming data from the content server, by using the first line. The second wireless unit 12 is a wireless unit that performs wireless communication by using a second line (e.g., Long Term Evolution [LTE]). The second wireless unit 12 is capable of accessing a content server (not illustrated) and obtaining streaming data from the content server, by using the second line. The audio output unit 13 is an output interface that outputs sound of picture data, audio data, or the like, for example. The display unit 14 is an output interface that displays various types of information. The ROM 15 is a storage area that stores therein various types of information, e.g., a computer program (hereinafter, "program") and the like. The RAM 16 is an area that stores therein various types of information. The storage unit 17 is an area that stores therein various types of data such as the streaming data and the like. In the storage unit 17, a cache 17A is provided to temporarily store therein the obtained streaming data. The CPU 18 controls the entirety of the mobile information device 1.

The ROM 15 is, for example, an area that stores therein a communication program. The CPU 18 reads the communication program stored in the ROM 15 and operates with functions realized by various types of processes, on the basis of the read communication program. The CPU 18 operates with functions realized as an obtaining unit 21, a reproducing unit 22, an issuing unit 23, a determining unit 24, a judging unit 25, and a controlling unit 26.

The obtaining unit 21 obtains data via the first line through the first wireless unit 11 and stores the obtained data into the cache 17A. The obtaining unit 21 obtains data via the second line through the second wireless unit 12 and stores the obtained data into the cache 17A. In this situation, the cache 17A stores therein the data obtained via the first line and the data obtained via the second line so as to be discriminated from each other. The reproducing unit 22 conducts streaming reproduction of the data stored in the cache 17A and outputs what is played back to the audio output unit 13 and the display unit 14.

Figure 2:
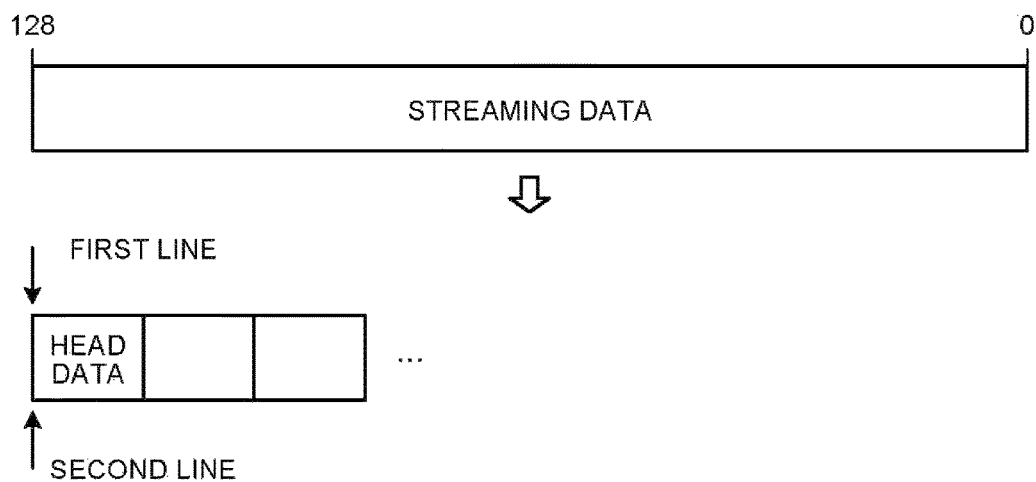
FIG. 2 is a drawing for explaining an example of streaming data.

FIG. 2 is a drawing for explaining an example of the streaming data. In the streaming data illustrated in FIG. 2, priority levels 0 to 128 are set in different positions (e.g., 129 positions) between the head and the tail end thereof. Priority level "128" is set at the head position, whereas priority level "0" is set at the tail-end position. In other words, the entirety of the streaming data is divided into 129 sections, so that the priority levels "128" to "0" are set at the 129 positions starting with the head position and ending with the tail-end position. Further, priority level "128" indicates the highest priority, whereas priority level "0" indicates the lowest priority. In other words, a task having priority level "128" is executed with the highest priority. The obtaining unit 21 starts an obtaining operation by using the first line and the second line at the same time, to obtain head data in an amount of x MB (e.g., 1024 bytes) taken from the head position of the streaming data. In this situation, the head data corresponds to a header of a content file representing the streaming data. It is assumed that the size of the file and whether the dividing process is possible or not are recorded in the header.

The issuing unit 23 divides unobtained data positioned near a reproduction position for streaming reproduction of the obtained data and further issues a task to one selected from the first wireless unit 11 and the second wireless unit 12, for each of the positions at which the data was divided.

Of the first and the second lines, the determining unit 24 determines one of the lines to be a main line and the other to be a sub line. After a high-speed streaming process is started, the determining unit 24 compares the quality of the lines (which hereinafter may be referred to as "line quality") between the first line and the second line by using a one-second cycle so as to determine the main line and the sub line. The determining unit 24 aggregates a communication amount of each of the lines and further calculates a throughput of each of the lines on the basis of the aggregated communication amounts. The throughput may be calculated as, for example, ([The most recent throughput]×3+[The communication amount in the most recent one-second period])/4. Further, the determining unit 24 calculates a degree of line reliability of each of the lines per second by correcting the calculated throughputs with the use of the following formula: [The throughput]×Math·pow(1.01, [The number of successful tasks in the most recent one-second period])×Math·pow(0.8, [The number of failed tasks in the most recent one-second period]).

Further, the determining unit 24 calculates the number of divided tasks to be optimally issued to each of the lines, i.e., an optimal number of tasks, by using the following formula: [The degree of line reliability]/[The lowest minimum throughput (a fixed value) needed by the execution of one task]. Further, the determining unit 24 compares the quality between the lines, on the basis of the optimal number of tasks of each of the lines. When a determining condition is satisfied where the optimal number of tasks for the first line (the Wi-Fi line) is smaller than 2, while the optimal number of tasks for the second line (the LTE line) is 2 or larger, the determining unit 24 determines the second line to be the main line and the first line to be the sub line. The reason why the threshold value for the optimal number of tasks is set to "2" in the determining condition is because the line is considered to have insufficient capability unless being able to execute at least two tasks simultaneously when the streaming data is divided so as to realize high-speed communication.

In contrast, when the determining condition is not satisfied, the determining unit 24 determines the first line to be the main line and the second line to be the sub line. It is assumed that, when the first line (the Wi-Fi line) has a capability equal to or higher than the lowest minimum level, the determining unit 24 determines the first line (the Wi-Fi line), which has a less expensive communication cost than the LTE line, to be the main line.

The issuing unit 23 issues the tasks to the wireless units of the main line and the sub line. The issuing unit 23 issues tasks to the wireless unit of the main line so as to realize a high-speed downloading process while prioritizing the obtainment at a reproduction position in the streaming process. Further, the issuing unit 23 issues tasks to the wireless unit of the sub line so as to realize a downloading process at an even higher speed, by utilizing the sub line.

Figure 3:
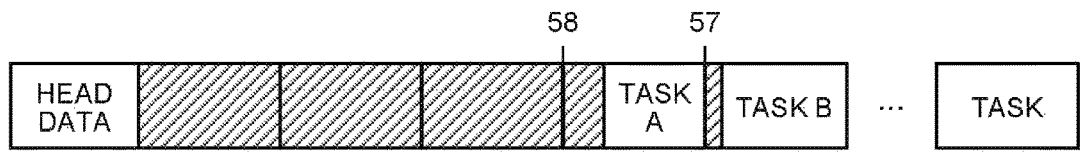
FIG. 3 is a drawing for explaining an example of priority levels of tasks.

The issuing unit 23 sets a priority level regarding the task execution, for each of the tasks issued to each of the lines, namely the first line and the second line. The first wireless unit 11 and the second wireless unit 12 each execute the tasks issued to the respective line, in descending order of the priority levels. FIG. 3 is a drawing for explaining an example of the priority levels of the tasks. As illustrated in FIG. 3, because task A having priority level "58" has a higher priority, the first wireless unit 11 executes task A having priority level "58" with a higher priority, while executing task B having priority level "57".

The controlling unit 26 controls the entirety of the CPU 18. The controlling unit 26 controls the issuing unit 23 so as to issue, to the first wireless unit 11 and to the second wireless unit 12, a task of executing the obtainment of head data of the streaming data, when the obtainment of the streaming data is started. On the basis of a communication state of the main line, the controlling unit 26 controls the issuing unit 23 so as to issue a part of an unexecuted part of the task as an aid task, to the wireless unit of the sub line selected from between the first wireless unit 11 and the second wireless unit 12.

The judging unit 25 judges whether or not data has been obtained in an amount equal to or larger than a predetermined volume while being continuous from a current reproduction position. In this situation, the predetermined volume may be, for example, a cache amount (y MB; e.g., 2 MB) that has already been obtained while being continuous from the current reproduction position. When the data has been obtained in an amount equal to or larger than the predetermined volume while being continuous from the current reproduction position, i.e., when the cached data that has already been obtained while being continuous from the reproduction position of the streaming process is equal to or larger than y MB (e.g., 2 MB), the controlling unit 26 sets a maximum issuance number to "M2", e.g., "4". In other words, when the already-obtained cache amount is equal to or larger than y MB, it is possible to increase the maximum issuance number because it is possible to tolerate, to some extent, a slow progress in the cache.

On the contrary, when the data has not been obtained in an amount equal to or larger than the predetermined volume while being continuous from the current reproduction position, i.e., when the cached data that has already been obtained while being continuous from the reproduction position of the streaming process is not equal to or larger than y MB, the controlling unit 26 decreases the maximum issuance number so as to be set to M1, e.g., "2". In other words, if the number of tasks were large, even when the throughput of the line is good, the resources of the CPU 18 to be assigned to the reproduction position and the tasks in the surroundings thereof would decrease, and the task at the reproduction position, which is supposed to be prioritized, would experience a delay depending on the capability of the CPU 18.

Figure 4:
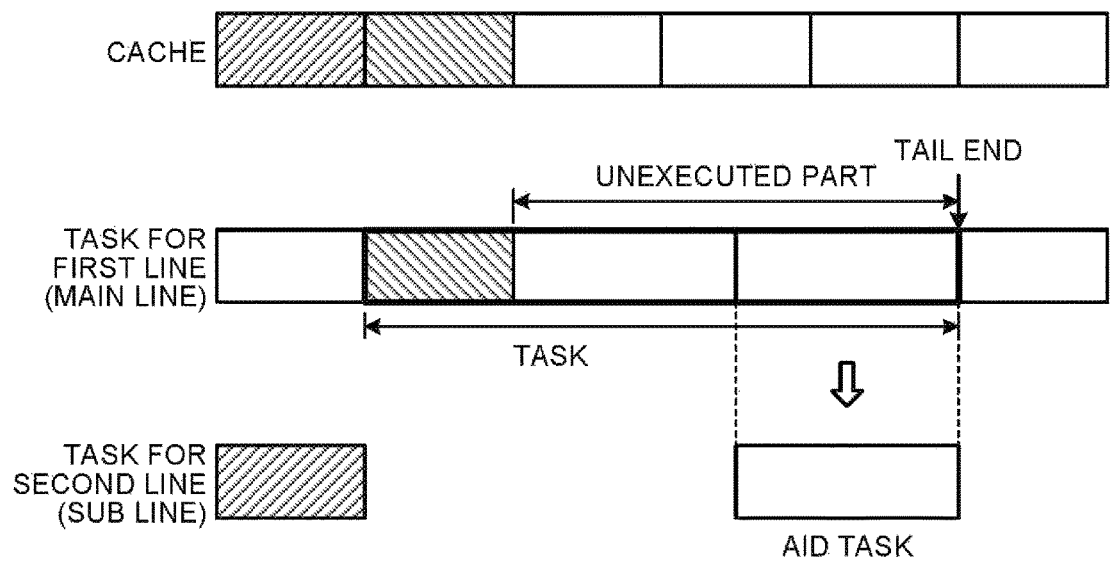
FIG. 4 is a drawing for explaining an example of an aid task issued to a wireless unit of a sub line.

FIG. 4 is a drawing for explaining an example of the aid task issued to the wireless unit of the sub line. While a task is being executed by using the first line as the main line, the controlling unit 26 checks on the progress of the task. Further, when the progress amount of the task is equal to or smaller than one-fourth of the task, the controlling unit 26 controls the issuing unit 23 so as to issue a half of the unexecuted part of the task taken from the tail end thereof to the wireless unit of the sub line, as an aid task. In that situation, the issuing unit 23 resets the priority levels of the tasks in the main line and the tasks in the sub line.

When a seek reproduction process is performed at an arbitrary reproduction position of data, the controlling unit 26 judges whether or not the data at the reproduction position, i.e., the data at the seek destination has already been cached in the cache 17A. When the data at the seek destination has already been cached, the controlling unit 26 continues processing the task currently being executed. On the contrary, when the data at the seek destination has not yet been cached, the controlling unit 26 discontinues processing the task currently being executed and further controls the issuing unit 23 so as to issue a task of obtaining the unobtained data at the seek destination.

Figure 5:
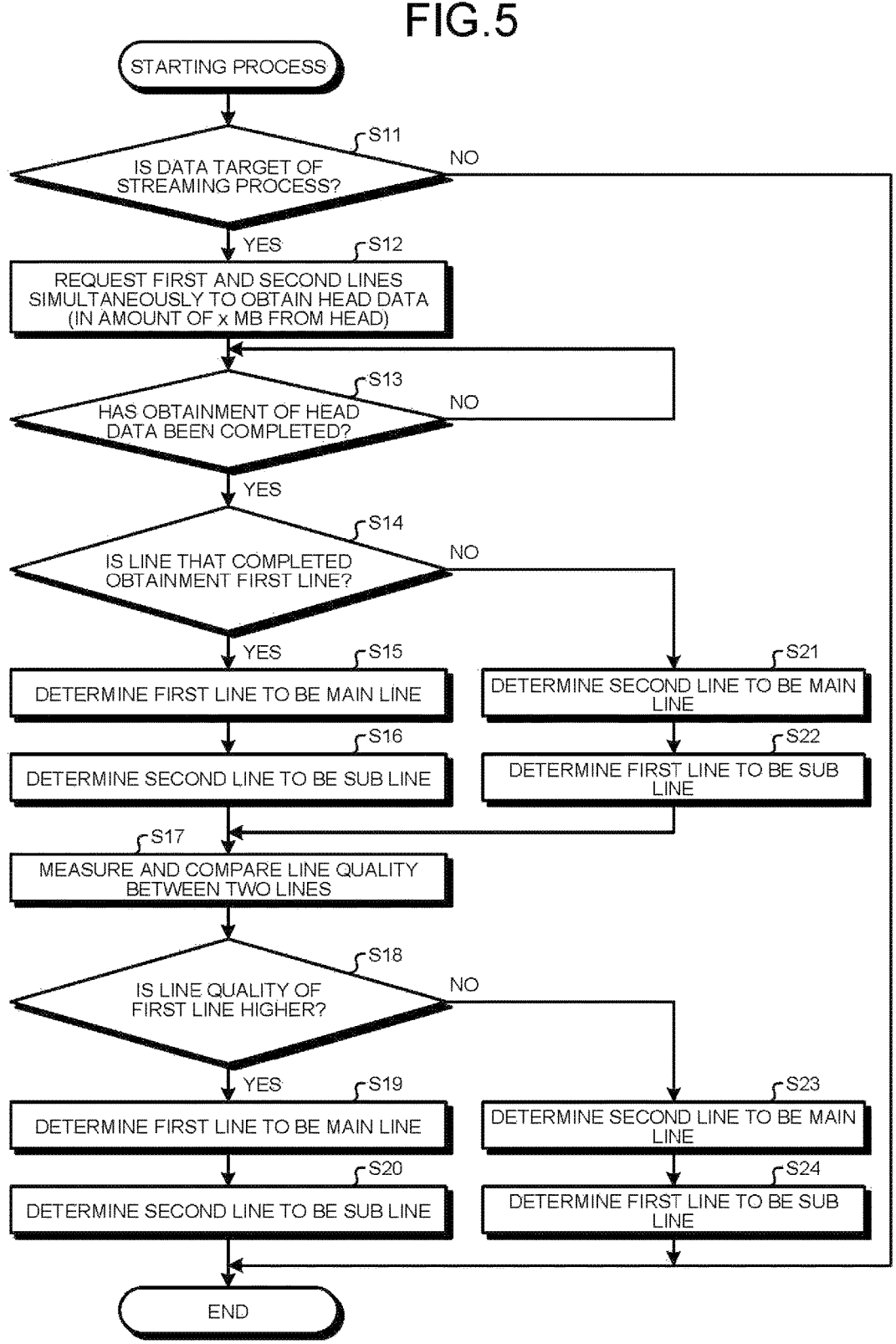
FIG. 5 is a flowchart of an example of a processing operation performed by a Central Processing Unit (CPU) in relation to a starting process.

Next, an operation performed by the mobile information device 1 according to the present embodiment will be explained. FIG. 5 is a flowchart of an example of a processing operation performed by the CPU 18 in relation to a starting process. The starting process illustrated in FIG. 5 is a process of obtaining the head data of streaming data with priority by employing a plurality of lines, when a high-speed streaming process is started. In FIG. 5, the obtaining unit 21 included in the CPU 18 judges whether or not data in question is a target of a streaming process (step S11). Whether the data is a target of a streaming process or not is judged according to whether the setting of the mobile information device 1 for a high-speed streaming process is turned on or off and the status of use of an application to be used or the like.

When the data in question is a target of a streaming process (step S11: Yes), the controlling unit 26 requests the first wireless unit 11 and the second wireless unit 12 to execute the task of obtaining the head data of the data through the first and the second lines, respectively, for example, in an amount of x MB taken from the head of the data (step S12). The first wireless unit 11 starts the operation of obtaining the head data by using the first line. The second wireless unit 12 also starts the operation of obtaining the same head data by using the second line.

The obtaining unit 21 judges whether or not the obtainment of the head data has been completed (step S13). When the obtainment of the head data has been completed (step S13: Yes), the determining unit 24 judges whether or not the line that completed the obtainment is the first line (step S14). When the line that completed the obtainment is the first line (step S14: Yes), the determining unit 24 determines the first line to be the main line (step S15) and determines the second line to be the sub line (step S16).

Further, the determining unit 24 measures and compares the line quality between the two lines (i.e., the first line and the second line) (step S17). On the basis of the result of the comparison, when the line quality of the first line is higher than the line quality of the second line (step S18: Yes), the determining unit 24 determines the first line to be the main line (step S19), determines the second line to be the sub line (step S20), and ends the processing operation illustrated in FIG. 5.

On the contrary, when the line that completed the obtainment is not the first line (step S14: No), the determining unit 24 determines that the obtainment of the head data was completed through the second line. The determining unit 24 therefore determines the second line to be the main line (step S21), determines the first line to be the sub line (step S22), and proceeds to step S17 where the determining unit 24 measures the line quality of the two lines.

Further, on the basis of the result of the comparison, when the line quality of the first line is not higher than that of the second line (step S18: No), the determining unit 24 determines the second line to be the main line (step S23), determines the first line to be the sub line (step S24), and ends the processing operation illustrated in FIG. 5.

In contrast, when the data in question is not a target of a streaming process (step S11: No), the obtaining unit 21 ends the processing operation illustrated in FIG. 5. When the obtainment of the head data has not yet been completed (step S13: No), the determining unit 24 proceeds to step S13 where the determining unit 24 judges whether or not the obtainment has been completed.

The CPU 18 executing the starting process requests, at the same time, the first wireless unit 11 and the second wireless unit 12 to execute the task of obtaining the head data of the streaming data by using the first line and the second line, respectively. As a result, even though the communication in one of the lines may be wasted, the CPU 18 is able to obtain the head data with highest priority.

Figure 6:
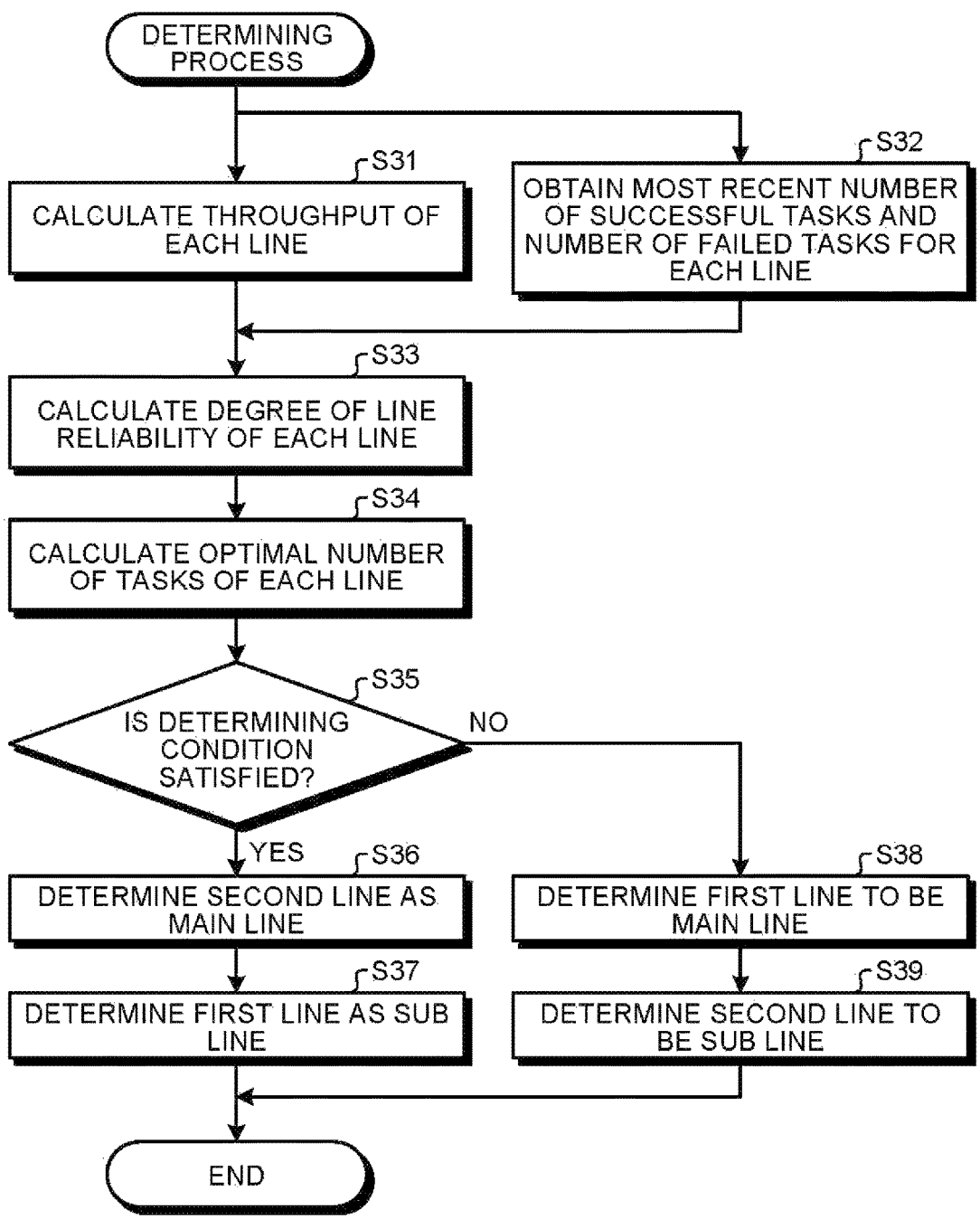
FIG. 6 is a flowchart of an example of a processing operation performed by the CPU in relation to a determining process.

FIG. 6 is a flowchart of an example of a processing operation performed by the CPU 18 in relation to a determining process. The determining process illustrated in FIG. 6 is a process of comparing the line quality between the lines by using a one-second cycle after a high-speed streaming process is started and further determining the main line on the basis of the result of the comparison.

In FIG. 6, the determining unit 24 included in the CPU 18 calculates a throughput of each of the lines (step S31). Further, in parallel to the process at step S31, the determining unit 24 obtains the most recent number of successful tasks and the most recent number of failed tasks, for each of the lines (step S32).

The determining unit 24 calculates a degree of line reliability of each of the lines on the basis of the throughput, the number of successful tasks, and the number of failed tasks of each of the lines (step S33). In this situation, the degrees of line reliability are calculated, for example, by using the following formula: [The throughput]×Math·pow (1.01, [The number of successful tasks in the most recent one-second period])×Math·pow(0.8, [The number of failed tasks in the most recent one-second period]). On the basis of the degree of line reliability of each of the lines, the determining unit 24 calculates an optimal number of tasks for each of the lines (step S34). For example, the optimal numbers of tasks are calculated, for example, by using the following formula: [The degree of line reliability]/[The lowest minimum throughput (a fixed value) needed by the execution of one task]

The determining unit 24 judges whether or not the determining condition is satisfied (step S35). The determining condition is a condition where the optimal number of tasks for the first line (the Wi-Fi line) is smaller than 2, while the optimal number of tasks for the second line (the LTE line) is 2 or larger. When the determining condition is satisfied (step S35: Yes), the determining unit 24 determines the second line (the LTE line) to be the main line (step S36), determines the first line (the Wi-Fi line) to be the sub line (step S37), and ends the processing operation illustrated in FIG. 6.

On the contrary, when the determining condition is not satisfied (step S35: No), the determining unit 24 determines the first line (the Wi-Fi line) to be the main line (step S38), determines the second line (the LTE line) to be the sub line (step S39), and ends the processing operation illustrated in FIG. 6.

The CPU 18 executing the determining process illustrated in FIG. 6 calculates the degree of line reliability of each of the lines on the basis of the throughput, the most recent number of successful tasks, and the most recent number of failed tasks of each of the lines and further calculates the optimal number of tasks for each of the lines on the basis of the calculated degrees of line reliability. When the determining condition is satisfied where the optimal number of tasks for the first line is smaller than 2, while the optimal number of tasks for the second line is 2 or larger, the CPU 18 determines the second line to be the main line and the first line to be the sub line. As a result, even when the first line does not have a capability at the lowest minimum level, as long as the second line has a capability equal to or higher than the lowest minimum level, it is possible to automatically determine the second line to be the main line and the first line to be the sub line.

In contrast, when the determining condition is not satisfied, the CPU 18 determines the first line to be the main line and the second line to be the sub line. As a result, it is possible to automatically determine the first line to be the main line and the second line to be the sub line. In other words, the CPU 18 is able to determine the main line and the sub line with an excellent level of precision, in the one-second cycle and on the basis of not only the throughputs of the lines, but also the degrees of line reliability reflecting the actual performance in the execution of the tasks.

Figure 7:
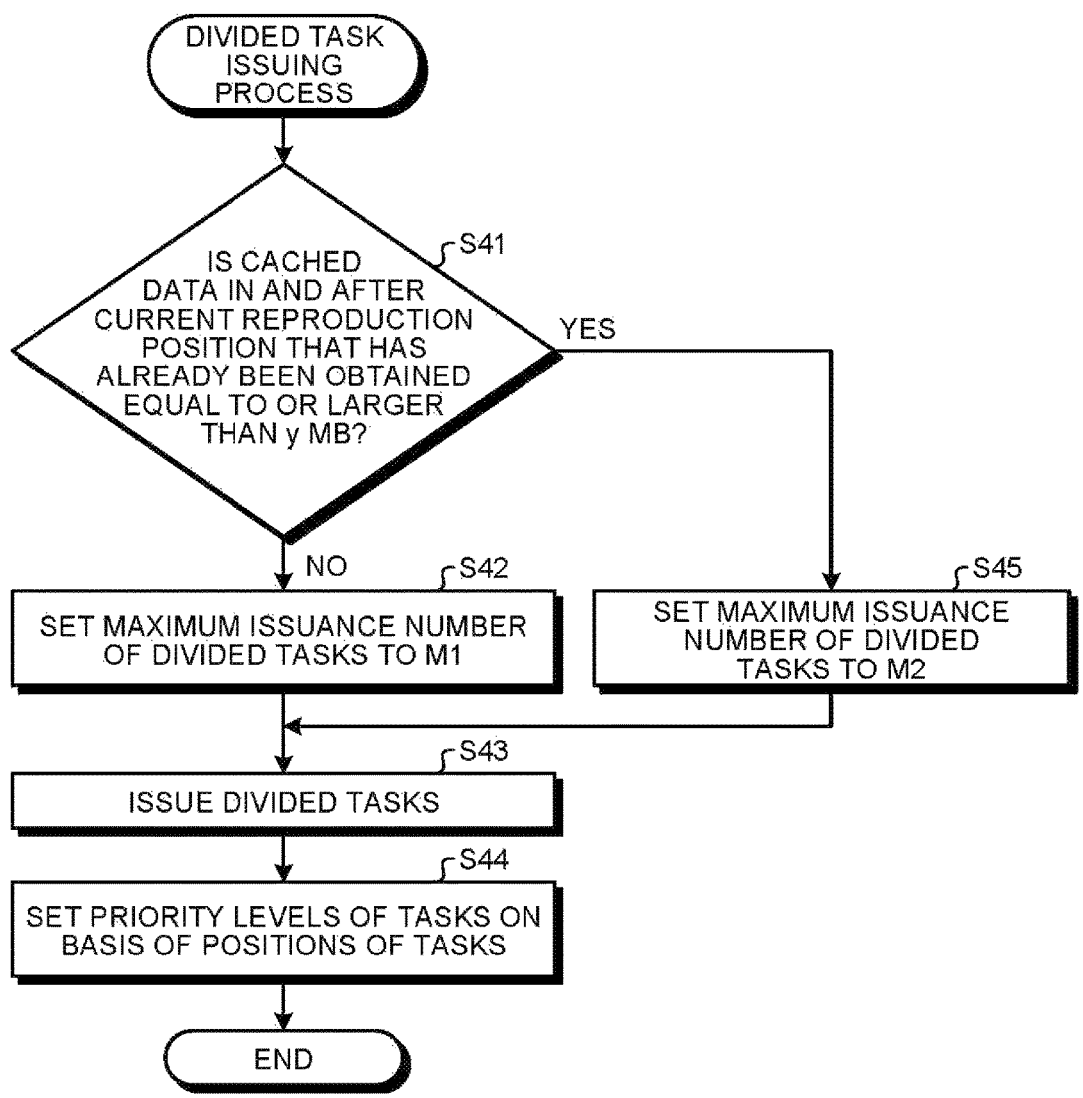
FIG. 7 is a flowchart of an example of a processing operation performed by the CPU in relation to a divided task issuing process.

FIG. 7 is a flowchart of an example of a processing operation performed by the CPU 18 in relation to a divided task issuing process. The divided task issuing process illustrated in FIG. 7 is a process of setting a maximum issuance number for the main line on the basis of cached data that has already been obtained in and after a current reproduction position and further issuing divided tasks to the main line within the range of the maximum issuance number. In FIG. 7, the judging unit 25 included in the CPU 18 judges whether or not continuous cached data in and after the current reproduction position that has already been obtained is equal to or larger than a predetermined volume, e.g., y MB (step S41). When the cached data in and after the reproduction position that has already been obtained is not equal to or larger than y MB (step S41: No), the controlling unit 26 sets the maximum issuance number of divided tasks to M1 (step S42). In this situation, the maximum issuance number M1 satisfies the relationship M1<M2. In other words, because the cache amount that has already been obtained is small, and there is not much leeway in the streaming reproduction process, this arrangement makes it possible to save the resources of the CPU 18 by decreasing the maximum issuance number, while prioritizing the obtainment at the reproduction position.

The issuing unit 23 issues the divided tasks (step S43), sets priority levels of the divided tasks on the basis of the positions of the issued divided tasks (step S44), and ends the processing operation illustrated in FIG. 7.

On the contrary, when the continuous cached data in and after the reproduction position that has already been obtained is equal to or larger than y MB (step S41: Yes), the controlling unit 26 sets the maximum issuance number of divided tasks to M2 (step S45) and proceeds to step S43 where the issuing unit 23 is caused to issue the divided tasks. In other words, because the cache amount that has already been obtained is large, and there is leeway in the streaming reproduction process, it is possible to increase the maximum issuance number, while prioritizing the obtainment at the reproduction position.

The CPU 18 executing the divided task issuing process illustrated in FIG. 7 decreases the maximum issuance number for the main line so as to be set to M1, when the continuous cached data in and after the current reproduction position that has already been obtained is not equal to or larger than the predetermined volume. As a result, it is determined that there is no leeway in the streaming reproduction process when the cached data that has already been obtained is not equal to or larger than the predetermined volume, and it is therefore possible to save the resources of the CPU 18 by arranging the maximum issuance number to be smaller, while prioritizing the obtainment at the reproduction position.

The CPU 18 increases the maximum issuance number for the main line so as to be set to M2, when the continuous cached data in and after the current reproduction position that has already been obtained is equal to or larger than the predetermined volume. As a result, it is determined that there is leeway in the streaming reproduction process when the cached data that has already been obtained is equal to or larger than the predetermined volume, and it is therefore possible to realize a high-speed streaming process by arranging the maximum issuance number to be larger.

On the basis of the positions of the issued divided tasks, the CPU 18 sets the priority levels of the divided tasks. As a result, the CPU 18 is able to execute the divided tasks in descending order of the priority levels.

Figure 8:
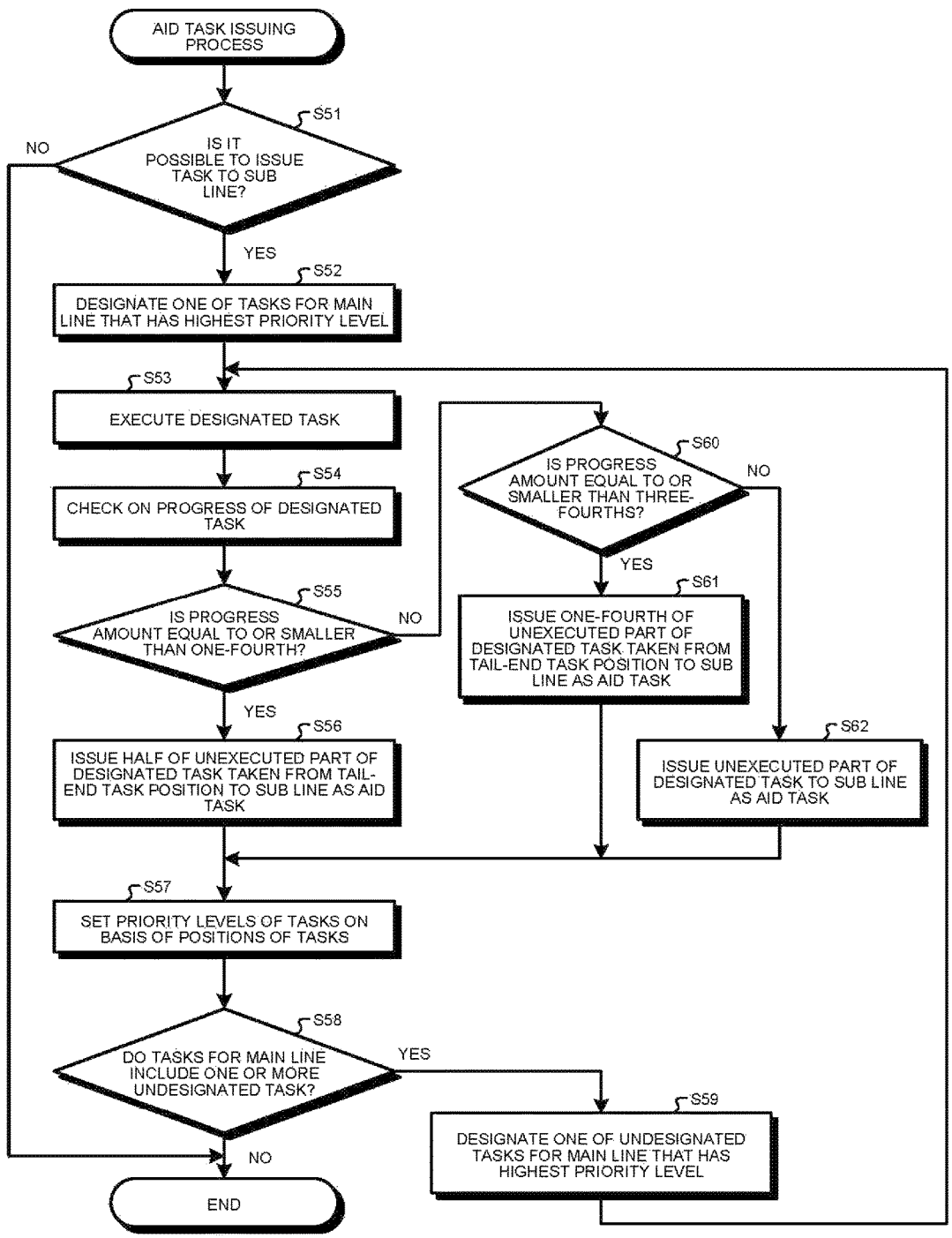
FIG. 8 is a flowchart of an example of a processing operation performed by the CPU in relation to an aid task issuing process.

FIG. 8 is a flowchart of an example of a processing operation performed by the CPU 18 in relation to an aid task issuing process. The aid task issuing processing illustrated in FIG. 8 is a process of issuing, on the basis of the progress of a process being executed in the tasks in the main line, a part of the unexecuted part of the task to the sub line in accordance with the progress. In FIG. 8, the controlling unit 26 included in the CPU 18 judges whether it is possible to issue a task to the sub line (step S51). When it is possible to issue a task to the sub line (step S51: Yes), the controlling unit 26 designates one of the tasks for the main line that has the highest priority level (step S52) so as to execute the designated task having the highest priority (step S53).

The controlling unit 26 checks on the progress of the process being executed on the designated task (step S54) and judges whether or not the progress amount of the designated task is equal to or smaller than one-fourth of the entire designated task (step S55). In this situation, the progress amount being equal to or smaller than one-fourth of the entire designated task means that three-fourths or more of the designated task remain as an unexecuted part.

When the progress amount of the designated task is equal to or smaller than one-fourth of the entire designated task (step S55: Yes), the issuing unit 23 issues a half of the unexecuted part of the designated task taken from the tail-end task position to the wireless unit of the sub line, as an aid task (step S56). In this situation, the priority level of the aid task for the sub line is set in accordance with the task position thereof, so that the aid task is executed in descending order of the priority levels. As for the task for the main line also, the unexecuted part of the task remaining after the aid task is issued is executed as a task.

After that, the controlling unit 26 resets the priority levels on the basis of the positions of the tasks for each of the lines (step S57) and further judges whether or not the tasks for the main line include one or more undesignated tasks (step S58). When there are one or more undesignated tasks (step S58: Yes), the controlling unit 26 designates one of the undesignated tasks for the main line that has the highest priority level (step S59) and proceeds to step S53 where the designated task is executed.

In contrast, when the progress amount of the designated task is not equal to or smaller than one-fourth of the entire designated task (step S55: No), the controlling unit 26 judges whether or not the progress amount of the designated task is equal to or smaller than three-fourths of the entire designated task (step S60). The progress amount being equal to or smaller than three-fourths of the entire designated task means that one-fourth or more of the designated task remains as an unexecuted part.

When the progress amount of the designated task is equal to or smaller than three-fourths of the entire designated task (step S60: Yes), the issuing unit 23 issues one-fourth of the unexecuted part of the designated task taken from the tail-end task position to the wireless unit of the sub line, as an aid task (step S61). After that, the issuing unit 23 proceeds to step S57 where the priority levels of the task positions are set.

In contrast, when the progress amount of the designated task is not equal to or smaller than three-fourths of the entire designated task (step S60: No), the issuing unit 23 issues the unexecuted part of the designated task to the wireless unit of the sub line as an aid task (step S62) and proceeds to step S57 where the priority levels of the task positions are set.

Further, in contrast, when the tasks for the main line include no undesignated task (step S58: No), the controlling unit 26 ends the processing operation illustrated in FIG. 8. When it is not possible to issue a task to the sub line (step S51: No), the controlling unit 26 ends the processing operation illustrated in FIG. 8.

The CPU 18 executing the aid task issuing process illustrated in FIG. 8 checks on the progress of the designated task for the main line and issues a part of the unexecuted part of the task to the wireless unit of the sub line as the aid task, in accordance with the progress amount of the task. As a result, it is possible to realize a streaming process at an even higher speed by issuing a part of the unexecuted part of the task to the wireless unit of the sub line as the aid task in accordance with the progress of the designated task for the main line and arranging the wireless unit of the sub line to aid the execution of the task for the main line.

As for the plurality of tasks in the main line, the CPU 18 is able to execute the tasks in descending order of the priority levels. Further, as for the plurality of tasks in the sub line, the CPU 18 executes the tasks in descending order of the priority levels. Consequently, the CPU 18 is able to realize a high-speed streaming process by executing the aid task with priority.

FIG. 9 is a flowchart of an example of a processing operation performed by the CPU 18 in relation to a task executing process. The task executing process illustrated in FIG. 9 is a process of comparing, for each of the lines, the current number of tasks with the optimal number of tasks and further adjusting the number of tasks issued in each of the lines on the basis of the result of the comparison. In FIG. 9, the controlling unit 26 included in the CPU 18 executes one of the tasks in the main line that has the highest priority level (step S71) and obtains the optimal number of tasks calculated by the determining unit 24 (step S72).

On the basis of the obtained optimal number of tasks, the controlling unit 26 judges whether or not the current number of tasks for the main line is insufficient (step S73). It is possible to judge whether the number of tasks is insufficient by judging whether or not the current number of tasks is smaller than the optimal number of tasks. When the current number of tasks for the main line is insufficient (step S73: Yes) i.e., when the current number of tasks is smaller than the optimal number of tasks, the issuing unit 23 executes a task adding process to add one or more tasks to the main line (step S74) and ends the processing operation illustrated in FIG. 9.

When the current number of tasks for the main line is not insufficient (step S73: No), the controlling unit 26 judges whether or not the current number of tasks for the main line is excessive on the basis of the obtained optimal number of tasks (step S75). It is possible to judge whether the number of tasks is excessive by judging whether or not the current number of tasks is larger than the optimal number of tasks. When the current number of tasks for the main line is excessive (step S75: Yes), i.e., when the current number of tasks is larger than the optimal number of tasks, the issuing unit 23 discontinues the execution of tasks in the main line starting with the task having the lowest priority (step S76) and ends the processing operation illustrated in FIG. 9. In contrast, when the current number of tasks of the main line is not excessive (step S75: No), the controlling unit 26 ends the processing operation illustrated in FIG. 9.

When the current number of tasks in the main line is insufficient with respect to the optimal number of tasks, the CPU 18 executing the task executing process illustrated in FIG. 9 adds one or more new tasks into the main line. As a result, it is possible to realize a high-sped streaming process because it is possible to add the new tasks within the limit of the optimal number of tasks.

When the current number of tasks in the main line is excessive with respect to the optimal number of tasks, the CPU 18 discontinues processing one or more of the tasks having lower priority levels in the main line. As a result, it is possible to realize a high-speed streaming process by reducing the load on the CPU 18 because it is possible to save the resources of the CPU 18. Further, because the tasks having the lower priority levels are discontinued, it is possible to efficiently execute the tasks when the execution of the tasks is resumed.

In the task executing process illustrated in FIG. 9, for the sake of convenience of the explanation, the tasks are executed in accordance with the priority levels within the main line, and the number of tasks in the main line is adjusted within the limit of the optimal number of tasks. However, another arrangement is acceptable in which the tasks are executed in accordance with the priority levels within the sub line, and the number of tasks in the sub line is adjusted within the limit of the optimal number of tasks.

FIGS. 10A and 10B are a drawing for explaining an exemplary operation in a task executing process during a seek operation. The seek operation is a process of seeking a desired reproduction position within streaming data. In seek pattern illustrated in FIG. 10A, when the data at a seek destination has already been obtained as cached data, the execution of the task in the unobtained part is continued as normal. In seek pattern illustrated in FIG. 10B, when the data at a seek destination has not yet been obtained as cached data, the task before the seek operation is discontinued, so as to set the priority level of the task at the seek destination to the highest level, and it is therefore possible to obtain the data at the seek destination with the highest priority.

According to the present embodiment, during the streaming communication, the data positioned near the reproduction position is divided and obtained with priority, instead of dividing the entirety of the streaming data into N sections. As a result, it is possible to realize a high-speed streaming process by prioritizing the obtainment of the data positioned near the reproduction position. Further, when obtaining the data positioned near the reproduction position, because the task executed on the data positioned near the reproduction position is prioritized without executing other tasks, it is possible to inhibit consumption of the resources of the CPU 18. As a result, it is possible to realize a high-speed streaming process because the consumption of the resources of the CPU 18 is inhibited.

The CPU 18 according to the present embodiment divides the unobtained data positioned near the reproduction position at which the streaming reproduction process is performed and further issues each task to the wireless unit of one selected from between the main line and the sub line, for each of the positions at which the data was divided. As a result, because the CPU 18 executes the task positioned near the reproduction position with priority, it is possible to realize high-speed streaming communication.

Further, on the basis of the progress of the tasks for the main line, the CPU 18 issues a part of the unexecuted part of the task to the wireless unit of the sub line, as the aid task. As a result, because the CPU 18 issues a part of the unexecuted part to the wireless unit of the sub line as the aid task, in accordance with the progress of the task for the main line, it is possible to realize a high-speed streaming process by utilizing the sub line, while reducing the processing load on the main line.

When starting the obtainment of the streaming data, the CPU 18 issues the task of obtaining the head data of the streaming data to the wireless units of the first line and the second line. As a result, even though the communication in one of the lines may be wasted, the CPU 18 is able to obtain the head data with the highest priority.

The CPU 18 determines the main line and the sub line on the basis of the degree of line reliability of each of the lines. As a result, the CPU 18 is able to determine the main line and the sub line with an excellent level of precision, on the basis of not only the throughputs of the lines, but also the degrees of line reliability reflecting the actual performance in the execution of the tasks.

The CPU 18 judges whether or not the data has been obtained in an amount equal to or larger than the predetermined volume while being continuous from the current reproduction position. When data has been obtained in an amount equal to or larger than the predetermined volume while being continuous from the reproduction position, the CPU 18 increases the value indicating how many tasks are issuable to the main line. As a result, it is determined that there is leeway in the streaming reproduction process because the data has not been obtained in an amount equal to or larger than the predetermined volume, and it is therefore possible to realize a high-speed streaming process by arranging the maximum issuance number to be large.

When data has not be obtained in an amount equal to or larger than the predetermined volume while being continuous from the reproduction position, the CPU 18 decreases the value indicating how many tasks are issuable to the main line. As a result, it is determined that there is no leeway in the streaming reproduction process because the data has not been obtained in an amount equal to or larger than the predetermined volume. Accordingly, it is possible to save the resources of the CPU 18 by keeping the maximum issuance number small, while prioritizing the obtainment at the reproduction position.

The CPU 18 sets the priority level with each of the tasks issued to each of the lines and executes the tasks in descending order of the priority levels. As a result, the CPU 18 is able to execute the tasks with priority, in descending order of the priority levels.

When performing the seek process during a streaming reproduction process, the CPU 18 obtains the data positioned near the reproduction position at the seek destination with priority. Further, when performing the seek process during a streaming reproduction process, when the data at a seek destination has not been obtained, the CPU 18 executes the obtainment of the data at the seek destination with the highest priority. As a result, while realizing a high-speed streaming process, it is also possible to accommodate the seek reproduction process.

In the embodiment described above, Wi-Fi and LTE are used as examples of the first and the second lines, for instance. However, the lines may be wireless lines such as a 3G line, an infrared communication line, a Bluetooth (registered trademark) line, or the like. The present disclosure is also applicable to wired lines such as optical lines, electrical lines, and the like.

In the embodiment described above, the mobile information device 1 is used as an example; however, possible embodiments are not limited to mobile information devices. The present disclosure is applicable to any communication device having a communication function using a plurality of lines.

In the embodiment described above, the two lines, namely the first line and the second line, are used as examples, so that the main line is assigned to one of the lines, while the sub line is assigned to the other line; however, possible embodiments are not limited to using two lines. The number of lines may be three or more. For example, when three lines are used, the main line is assigned to one of the three lines, while the sub line is assigned to the other two lines.

In the determining process in the embodiment described above, the main line is determined in consideration of offloading the Wi-Fi line (the first line); however, various modifications are applicable as appropriate. It is also acceptable to set priority levels between the lines as a user setting, so that the main line is determined on the basis of the priority levels of the lines that are set.

In the aid task issuing process according to the embodiment described above, a part of the unexecuted part is issued as a task for the sub line in accordance with the degree of progress of the designated task in the main line. In other words, the length of the aid task for the sub line is set according to the length of the unexecuted part. However, another arrangement is also acceptable in which the length of the aid task to be issued to the sub line is varied on the basis of the throughputs of the lines. For example, it is acceptable to vary the length of the aid task to be issued to the sub line by using the following formula: [The length of the aid task for the sub line]=[The remaining part of the task for the main line]×[The throughput of the sub line]/([The throughput of the main line]+[The throughput of the sub line]).

In the embodiment described above, the first line is the Wi-Fi line, whereas the second line is the LTE line so that the two lines use the mutually-different methods; however, the first line and the second line may be lines using mutually-the-same method.

In the embodiment described above, the priority level at the head position of the streaming data is set to "128", whereas the priority level at the tail-end position is set to "0", so that the priority levels "128" to "0" are set in the 129 fixed positions from the head position to the tail-end position; however, it is also acceptable to set, as appropriate, priority levels at different positions within the data in the unobtained part, instead of setting the priority levels at the positions in the entirety of the streaming data in the fixed manner. Further, although the priority levels are set with the values "0" to "128" in the example above, possible embodiments are not limited to these numerical values, and it is acceptable to modify the numerical values, as appropriate.

Further, the constituent elements of the illustrated functional units do not necessarily have to be physically configured as indicated in the drawings. In other words, the specific modes of distribution and integration of the functional units are not limited to the ones illustrated in the drawings. It is acceptable to functionally or physically distribute or integrate all or a part of the constituent elements in any arbitrary units, depending on various loads and the status of use.

Further, all or an arbitrary part of the various types of processing functions performed by the devices may be executed by a Central Processing Unit (CPU) (or a microcomputer such as a Micro Processing Unit (MPU), a Micro Controller Unit (MCU), or the like). Further, needless to say, all or an arbitrary part of the various types of processing functions may be executed by a program analyzed and executed by a CPU (or a microcomputer such as an MPU, an MCU, or the like) or by hardware using wired logic.

Figure 11:
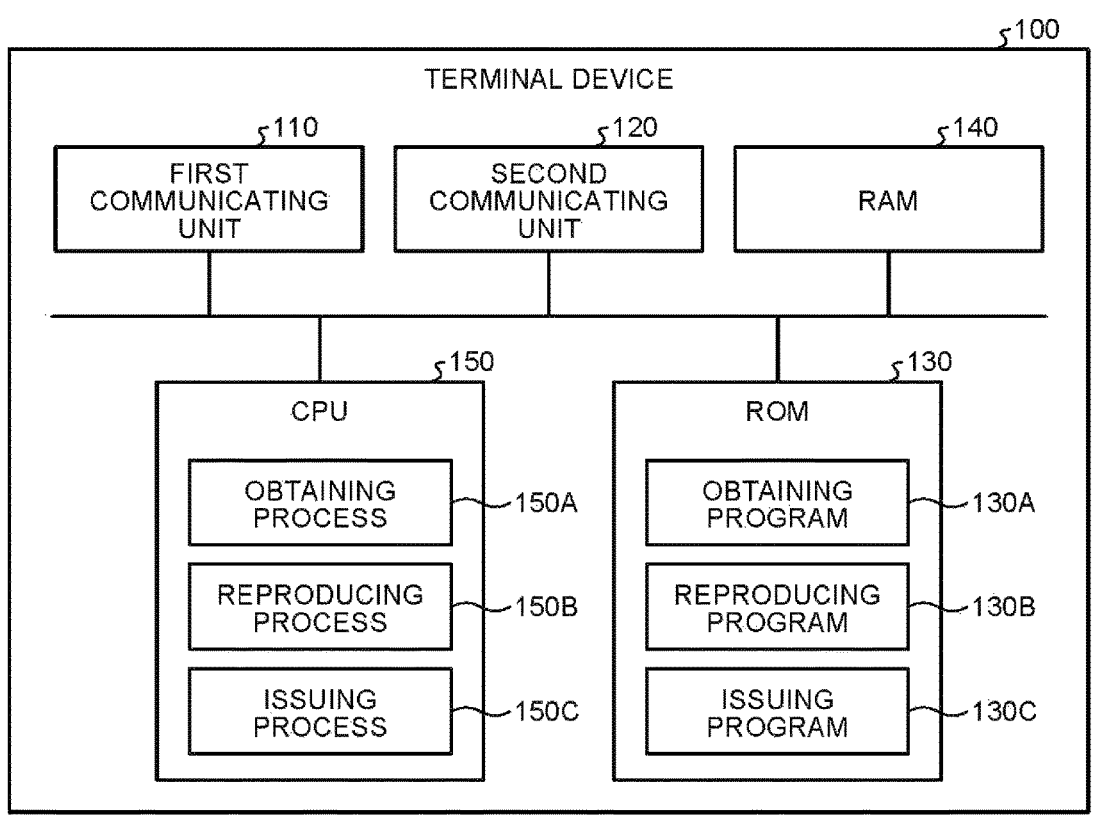
FIG. 11 is a diagram for explaining an example of a terminal device that executes a communication computer program.

The various types of processes explained in the present embodiment may be realized by causing a processor such as a CPU provided in a terminal device to execute a program prepared in advance. Thus, in the following sections, an example of the terminal device that executes a program having the same functions as those in the embodiment described above will be explained. FIG. 11 is a diagram for explaining an example of the terminal device that executes the communication program.

A terminal device 100 that executes a communication program illustrated in FIG. 11 includes a first communicating unit 110, a second communicating unit 120, a ROM 130, a RAM 140, and a CPU 150. Further, the first communicating unit 110, the second communicating unit 120, the ROM 130, the RAM 140, and the CPU 150 are connected together via a bus. The first communicating unit 110 accesses a content server (not illustrated) by using a first line and obtains data from the content server. The second communicating unit 120 accesses a content server (not illustrated) by using a second line and obtains data from the content server.

Further, the ROM 130 has stored therein, in advance, the communication program that realizes the same functions as those in the embodiment described above. As the communication program, the ROM 130 has stored therein an obtaining program 130A, a reproducing program 130B, and an issuing program 130C. Alternatively, the communication program may be recorded on a recording medium that is computer-readable through a driving device (not illustrated), instead of in the ROM 130. For example, the recording medium may be a portable recording medium such as a Compact-Disk Read-Only Memory (CD-ROM), a Digital Versatile Disk (DVD), or a Universal Serial Bus (USB) memory, or a semiconductor memory such as a flash memory.

Further, the CPU 150 functions as an obtaining process 150A by reading the obtaining program 130A from the ROM 130. Further, the CPU 150 functions as a reproducing process 150B, by reading the reproducing program 130B from the ROM 130. Also, the CPU 150 functions as an issuing process 150C by reading the issuing program 130C from the ROM 130.

The CPU 150 obtains data by using one selected from between the first line and the second line. The CPU 150 then reproduces the obtained data by performing a streaming reproduction process thereon. Further, the CPU 150 divides unobtained data positioned near a reproduction position at which the streaming reproduction process is performed on the obtained data and further issues a task of executing the obtainment of data to one selected from between the first line and the second line, for each of the positions at which the data was divided. As a result, the CPU 150 is able to realize a high-speed streaming process because the CPU 150 divides the unobtained data positioned near the reproduction position and issues a task for each of the positions at which the data was divided.

It is possible to realize high-speed streaming communication.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication method implemented by a communication device, the communication method comprising:
conducting streaming reproduction of obtained data which is to be obtained by a first obtaining task using at least one of a first line and a second line; and
dividing the first obtaining task into a plurality of second obtaining tasks when data at a reproduction position for the streaming reproduction is unobtained, a size of data to be obtained by each of the plurality of second obtaining tasks being smaller than a size of data to be obtained by the first obtained task;

issuing the plurality of second obtaining tasks using at least one of the first line and the second line;

issuing a task of executing obtainment of head data of the data to be obtained to the first line and the second line, when obtainment of the data to be obtained is started;

judging whether or not a line that completed the obtainment is the first line when the obtainment of the head data has been completed;

determining the first line to be the main line when the line that completed the obtainment is the first line; and determining the second line to be the main line when the line that completed the obtainment is not the first line.

2. The communication method according to claim 1, further comprising issuing a part of an unexecuted part of a task that is currently being executed by the main line to the sub line as a new task, on a basis of a communication state of the main line.

3. The communication method according to claim 2, wherein the communication state of the main line is detected on a basis of a degree of progress of a process performed on each of tasks currently being executed by the main line.

4. The communication method according to claim 2, wherein the communication state of the main line is detected on a basis of line quality of the first line and line quality of the second line.

5. The communication method according to claim 2, further comprising:

judging whether or not data is obtained in an amount equal to or larger than a predetermined volume, while being continuous from a current reproduction position; and increasing a maximum number of tasks to be issued to the main line when the data is obtained in the amount equal to or larger than the predetermined volume while being continuous from the current reproduction position and decreasing the maximum number of tasks to be issued to the main line when the data is not obtained in the amount equal to or larger than the predetermined volume while being continuous from the current reproduction position.

6. The communication method according to claim 1, further comprising:

with regard to each task issued to each of the first and the second lines, setting a priority level for executing the task, and executing the task in descending order of the priority level.

7. A communication device comprising:

a first obtaining unit that obtains data by using a first line;

a second obtaining unit that obtains data by using a second line;

a reproducing unit that conducts streaming reproduction of the data to be obtained by a first obtaining task executed by at least one of the first obtaining unit and the second obtaining unit;

an issuing unit that divides the data to be obtained into a plurality of second obtaining tasks when data at a reproduction position for the streaming reproduction is unobtained, a size of data to be obtained by each of the plurality of second obtaining tasks being smaller than a size of the data to be obtained by the first obtaining task, issues the plurality of second obtaining tasks using at least one of the first obtaining unit and the second obtaining unit, and issues a task of executing obtainment of head data of the data to be obtained to the first obtaining unit and the second obtaining unit, when obtainment of the data to be obtained is started;

a judging unit that judges whether or not a line that completed the obtainment is the first line when the obtainment of the head data has been completed; and a determining unit that determines the first line to be the main line when the first obtaining unit completed the obtainment, and determines the second line to be the main line when the first obtaining unit did not complete the obtainment.

8. A non-transitory computer-readable recording medium having stored therein a communication program that causes a communication device to execute a process comprising:

obtaining data by using one selected from a first line and a second line;

conducting streaming reproduction of the obtained data; and dividing the first obtaining task into a plurality of second obtaining tasks when data at a reproduction position for the streaming reproduction is unobtained, a size of data to be obtained by each of the plurality of second obtaining tasks being smaller than a size of data to be obtained by the first obtaining task;

issuing the plurality of second obtaining tasks using at least one of the first line and the second line;

issuing a task of executing obtainment of head data of the data to be obtained to the first line and the second line, when obtainment of the data to be obtained is started;

judging whether or not a line that completed the obtainment is the first line when the obtainment of the head data has been completed;

determining the first line to be the main line when the line that completed the obtainment is the first line; and determining the second line to be the main line when the line that completed the obtainment is not the first line.

* * * * *

UNITED STATES PATENT AND TRADEMARK OFFICE
CERTIFICATE OF CORRECTION

PATENT NO. : 10,484,444 B2
APPLICATION NO. : 15/237016
DATED : November 19, 2019
INVENTOR(S) : Masatoshi Tsubouchi It is certified that error appears in the above-identified patent and that said Letters Patent is hereby corrected as shown below:

On the Title Page

Item (73)
Change:
(73) Assignee: FUJITSU LIMITED, Kawasaki (JP)

To be:
(73) Assignee: FUJITSU CONNECTED TECHNOLOGIES LIMITED, Kawasaki (JP)

Signed and Sealed this
Twenty-eighth Day of April, 2020

Andrei Iancu
*Director of the United States Patent and Trademark Office*